(12) United States Patent
Faifer

(10) Patent No.: US 7,909,301 B2
(45) Date of Patent: *Mar. 22, 2011

(54) GRIP WITH BIPOD

(76) Inventor: Sagi Faifer, Mishmar Hashiva (IL)

( * ) Notice: Subject to any disclaimer, the term of this patent is extended or adjusted under 35 U.S.C. 154(b) by 123 days.

This patent is subject to a terminal disclaimer.

(21) Appl. No.: 12/190,604

(22) Filed: Aug. 13, 2008

(65) Prior Publication Data

US 2009/0045304 A1 Feb. 19, 2009

Related U.S. Application Data

(60) Provisional application No. 60/955,406, filed on Aug. 13, 2007.

(51) Int. Cl.
*F16M 11/32* (2006.01)

(52) U.S. Cl. .................. 248/440.1; 248/166; 248/188.5; 42/94

(58) Field of Classification Search .................. 248/171, 248/440.1, 176.3, 166, 436, 649, 688; 89/40.06, 89/1.42, 37.03, 37.04; 403/113; 42/94; D22/108, D22/199

See application file for complete search history.

(56) References Cited

U.S. PATENT DOCUMENTS

| | | | |
|---|---|---|---|
| 4,545,660 A | 10/1985 | Rudolf | |
| 4,984,090 A | 1/1991 | Sasaki | |
| 5,711,103 A | 1/1998 | Keng | |
| 6,763,627 B1 * | 7/2004 | Kaempe | 42/94 |
| 6,843,015 B2 | 1/2005 | Sharp | |
| 7,032,494 B2 * | 4/2006 | Wygant | 89/37.04 |
| 7,111,424 B1 | 9/2006 | Moody | |
| 7,197,844 B2 | 4/2007 | Benson | |
| 7,584,568 B1 | 9/2009 | Brownlee | |
| 2005/0188596 A1 * | 9/2005 | Wygant | 42/94 |
| 2005/0241206 A1 | 11/2005 | Teetzel | |
| 2008/0052979 A1 | 3/2008 | Lee | |
| 2009/0038199 A1 | 2/2009 | Oz | |
| 2009/0038200 A1 | 2/2009 | Keng | |

FOREIGN PATENT DOCUMENTS

GB 2456545 7/2009

* cited by examiner

*Primary Examiner* — Gwendolyn Baxter
(74) *Attorney, Agent, or Firm* — Deborah Gador

(57) ABSTRACT

A grip including at least two hinged monopods, each having an independent telescoping leg, the monopods in the closed position forming a hand grip, and a mounting assembly for mounting the grip on a device, and a method for forming the grip. Preferably, the telescopic leg includes a housing in each of the monopods and at least one spring biased leg telescopingly mounted in the housing.

13 Claims, 8 Drawing Sheets

GRIP WITH BIPOD

FIELD OF THE INVENTION

The present invention relates to bipods for firearms, cameras and other devices. More particularly the invention relates to a support grip which is also a bipod.

BACKGROUND OF THE INVENTION

A foregrip is a grip on the front of a firearm that can be used to help support the firearm, and prevents burns from the barrel during firing. The foregrip is preferably shaped for comfortable gripping with a hand, for example, having a rounded shape.

A bipod is a two-leg device used to position, support, and stabilize a device which requires aiming, such as a firearm or a camera. Bipods with adjustable legs are well known in the art, such as U.S. Pat. No. 5,711,103 to Keng. The bipod described by Keng was not designed as a grip, and is folded against the barrel when not in use.

U.S. Pat. No. 7,111,424 to Moody discloses a combination of a grip and a bipod. Moody teaches a grip with a concealable and collapsible bipod. The grip includes a tubular recess that serves as a housing for the bipod legs when concealed and for a sliding piston assembly that deploys the bipod legs. Moody teaches a complicated mechanism for sliding the piston, and a spring-loaded fulcrum release mechanism positioned at the top of the handle.

A disadvantage of the bipod of Moody is that the legs are deployed together with one another, and are limited to the same length, since there is only one piston mechanism for both of the legs.

Accordingly, there is a long felt need for a simple single device that combines a bipod having separately adjustable legs, in one position, and a grip, in a second position.

SUMMARY OF THE INVENTION

There is provided, according to the present invention, a grip including at least two hinged monopods, each having an independent telescopic structure. In the fastened position, the monopods are joined and secured to one another to form a shaped hand grip. The telescopic structure includes a housing inside each of the monopods with at least one independent spring biased telescoping leg mounted in one end of and extending from the housing. Each monopod defines a toothed portion at the other end of the housing. The toothed portions are arranged to interleave with one another when the monopods pivot relative to one another between a fastened position and a deployed position. The grip further includes a mounting assembly for mounting the grip on a device. The mounting assembly includes a hinge holding the toothed portions and forming a pivot axis therefor. The monopods further include locking elements for locking the telescoping leg inside or outside the housing.

In one embodiment of the present invention, each monopod includes locking means for locking the telescoping leg at a desired position relative to the housing. The locking means may include at least two locking grooves along each telescoping leg and a spring biased locking member inside the housing arranged to selectably engage one of the grooves.

Preferably, the monopods further include fastening elements for fastening the monopods relative to each other. The fastening elements may include a fastening hook on at least one of the telescoping legs engageable inside the housing of the other telescoping leg.

BRIEF DESCRIPTION OF THE DRAWINGS

The present invention will be further understood and appreciated from the following detailed description taken in conjunction with the drawings in which.

DETAILED DESCRIPTION OF THE INVENTION

The present invention relates to a combination of a grip and a bipod formed of hinged monopods. The monopods, in the deployed position, can be used to position, support, and stabilize a device which needs stabilization when aimed at a target, such as a firearm, camera and so on. The monopods together, when fastened to one another, are shaped as a hand grip, which can be used to control the device on which it is mounted.

Figure 1:
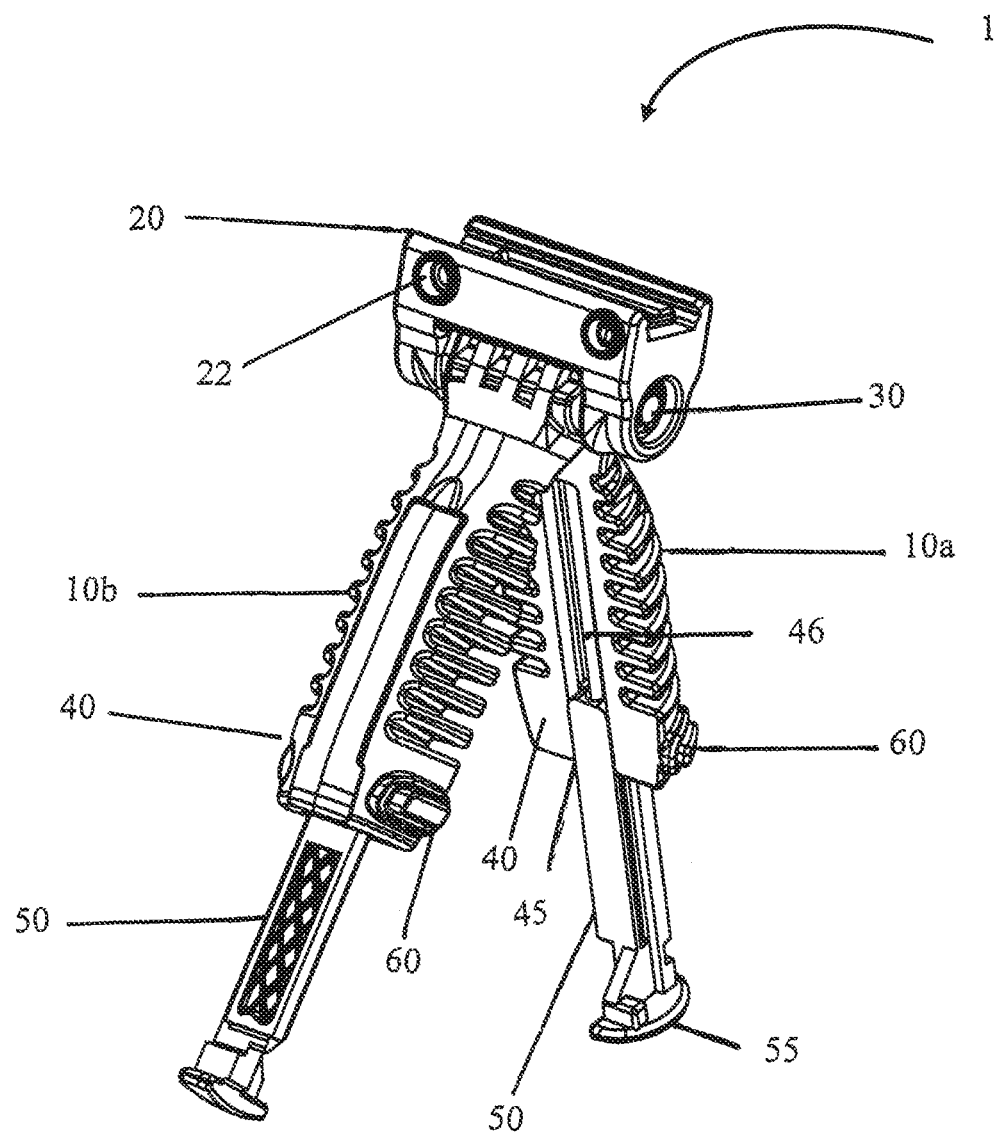
FIG. 1 is a perspective illustration of a grip constructed and operative in accordance with one embodiment of the present invention in deployed position.
Figure 2:
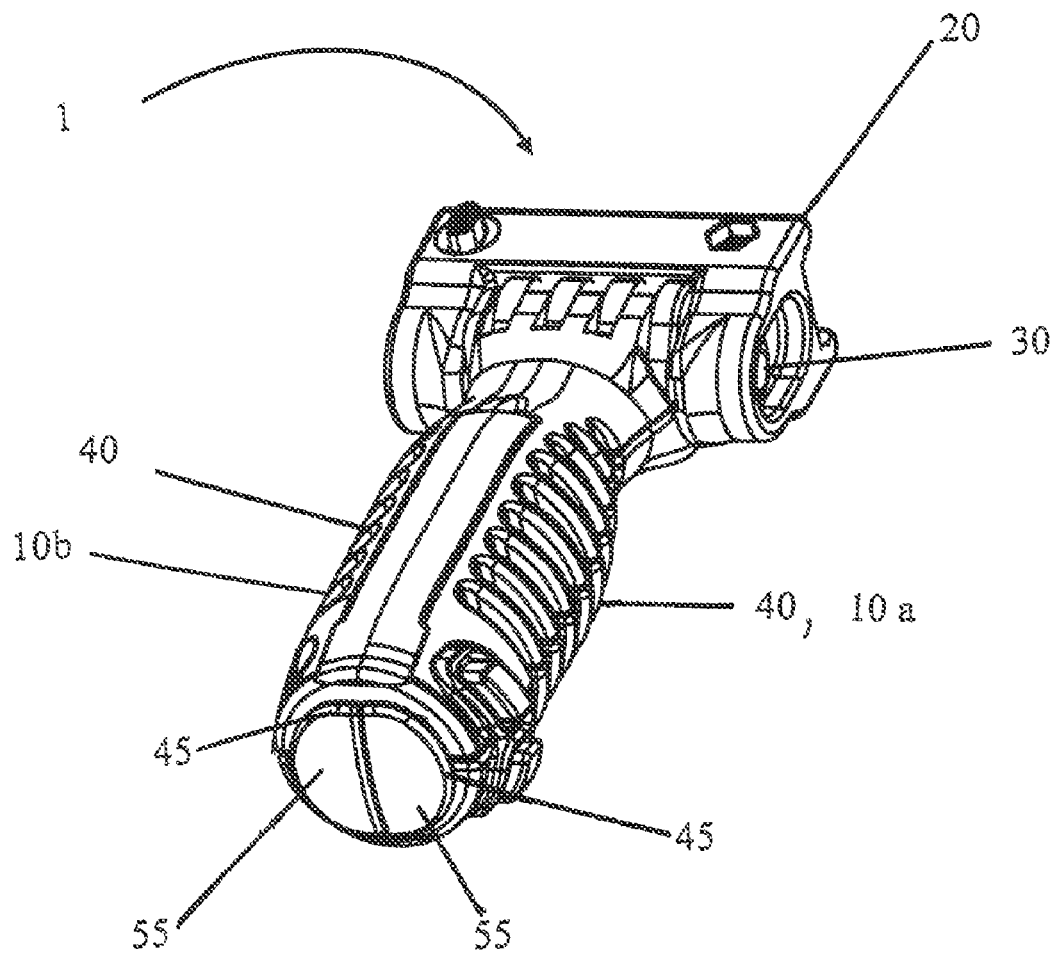
FIG. 2 is a bottom perspective illustration of the grip of FIG. 1 in the closed position.

Referring to FIGS. 1 and 2, there are shown schematic perspective illustrations of a grip 1 constructed and operative in accordance with one embodiment of the present invention, in the deployed and fastened positions, respectively. Grip 1 includes two monopods 10a and 10b and a mounting assembly 20 for mounting the grip on the device. The mounting assembly 20 may feature an adaptable mounting head to interface with a mounting rail, such as a Weaver or Picatinny Rail, or may be a simple bolt attachment to a selected device, such as a firearm. A securing element 22 may be provided to secure the mounting assembly 20 to a rail of the device.

At the bottom of the mounting assembly 20, there is a hinge 30 holding monopods 10a and 10b, allowing the monopods to pivot to the deployed position shown in FIG. 1 or to the fastened position shown in FIG. 2. According to the illustrated embodiment, each of monopods 10a and 10b includes a spring biased telescopic leg 50 mounted in tracks 46 in housing 40. Telescoping leg 50 is adapted to slide in and out of housing 40 through opening 45. Each telescoping leg 50 includes a foot 55 which may be attached to leg 50 by known means or may be integral with leg 50. Feet 55 are preferably complementary to each other when in the fastened position. An example of two complementary shapes is shown in FIG. 2, where each of feet 55 is substantially semi-circular at its base so as to create a circular shape when in the fastened position. The shape of feet 55 preferably fits the shape of the bottom of housing 40, creating a complete hand grip when in the fastened and retracted position.

Each of the monopods defines a toothed portion at the other end of the housing from the telescoping leg. The toothed portions are arranged to interleave with one another when the monopods pivot relative to one another between a fastened position and a deployed position. Hinge 30 holds the toothed portions and forms a pivot axis therefor.

The bipod in grip 1 can be deployed in different positions. In the completely deployed position, grip 1 opens to two monopods 10a and 10b pivoted apart from each other. Springs 15 (best seen in FIG. 3), or other extension mechanism, extend legs 50 out of monopod 10a, 10b, to the desired length. According to this embodiment, extending each of legs 50 is carried out by pressing a button 65, which actuates a locking member 60 (shown in FIG. 3). Pressing button 65 releases each of legs 50 from the opening 45 of housing 40. Alternatively, other release means may be used. The release means can be located in any convenient location on the grip, i.e., near the mounting assembly or in the handle. Buttons 65 are independent relative to each other and can be pressed separately. Thus, a particular feature of the grip is that the height of each monopod can be fixed independently. On the other hand, the release means of the two monopods are preferably disposed close enough to one another that they can be pressed simultaneously, for rapid deployment, if desired.

In the fastened position, shown in FIG. 2, legs 50 slide into tracks 46 in housing 40, and monopods 10a and 10b are joined and secured one to the other, together forming the grip.

Figure 3:
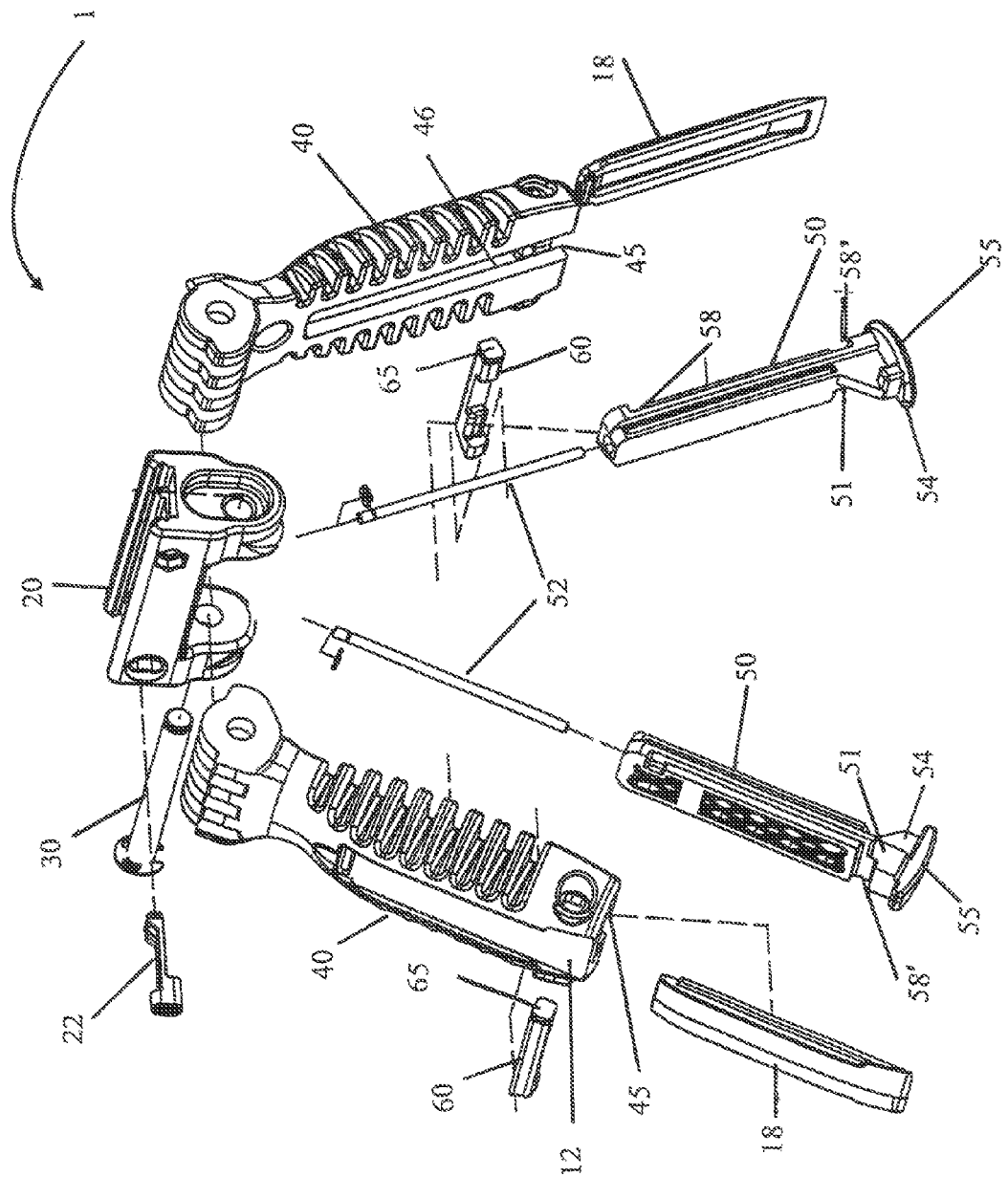
FIG. 3 is an exploded view of the grip of FIG. 1.

Referring now to FIG. 3, there is shown an exploded view of the grip of FIG. 1. FIG. 3 shows locking members 60, according to one embodiment of the invention, mounted inside each housing 40. Each of legs 50 includes a first locking groove 58 on the top end, and a second locking groove 58' near the bottom end adjacent foot 55. Locking member 60 engages groove 58 on the top or locking groove 58' on the bottom, in order to lock each of leg 50 in the extended or retracted position, respectively. It will be appreciated that locking of legs 50 in either position may be carried out in any other known manner. Each of stop members 60 protrudes out of housing 40 defining a release button 65.

According to this embodiment, grip 1 further includes removable pressure pad plates 18 that can be inserted into grooves 12 of the grip. An electric pressure switch (not shown), for example, of a laser or a spotlight, can be inserted into the grooves 12 and covered by the pad plates 18 and be activated from outside to turn on and off a laser or another electric device without providing access to dirt from outside the grip into the switch.

According to this embodiment, monopods 10a and 10b are fastened one relative to the other with a fastening hook 54 on each of feet 55. The bottom of each of legs 50 includes a partial cutaway section 51 defining a recess for receiving the fastening hook 54 of the opposite leg, allowing the two legs to join together, as shown in FIG. 2. When the monopods are joined together, fastening hook 54 of each of the legs is received in partial cutaway section 51 of the opposite leg. When legs 50 are fully inserted into housings 40 through openings 45, fastening hook 54 of each of monopods 10a, 10b seats in opening 45 of the opposite monopod, thereby preventing the two monopods from moving apart from one another.

Figure 4:
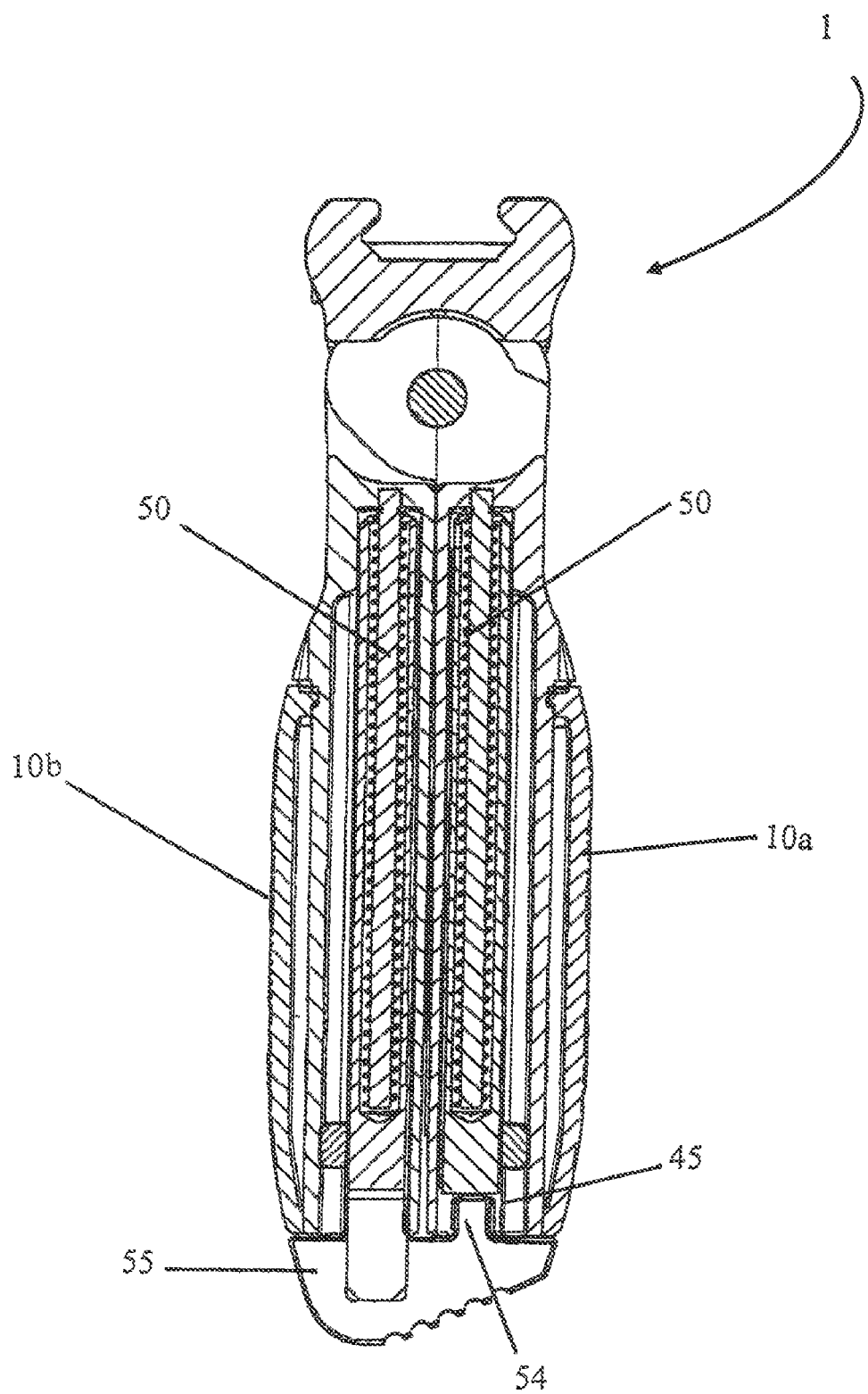
FIG. 4 is a sectional view of the grip of FIG. 1 in the closed position.
Figure 5:
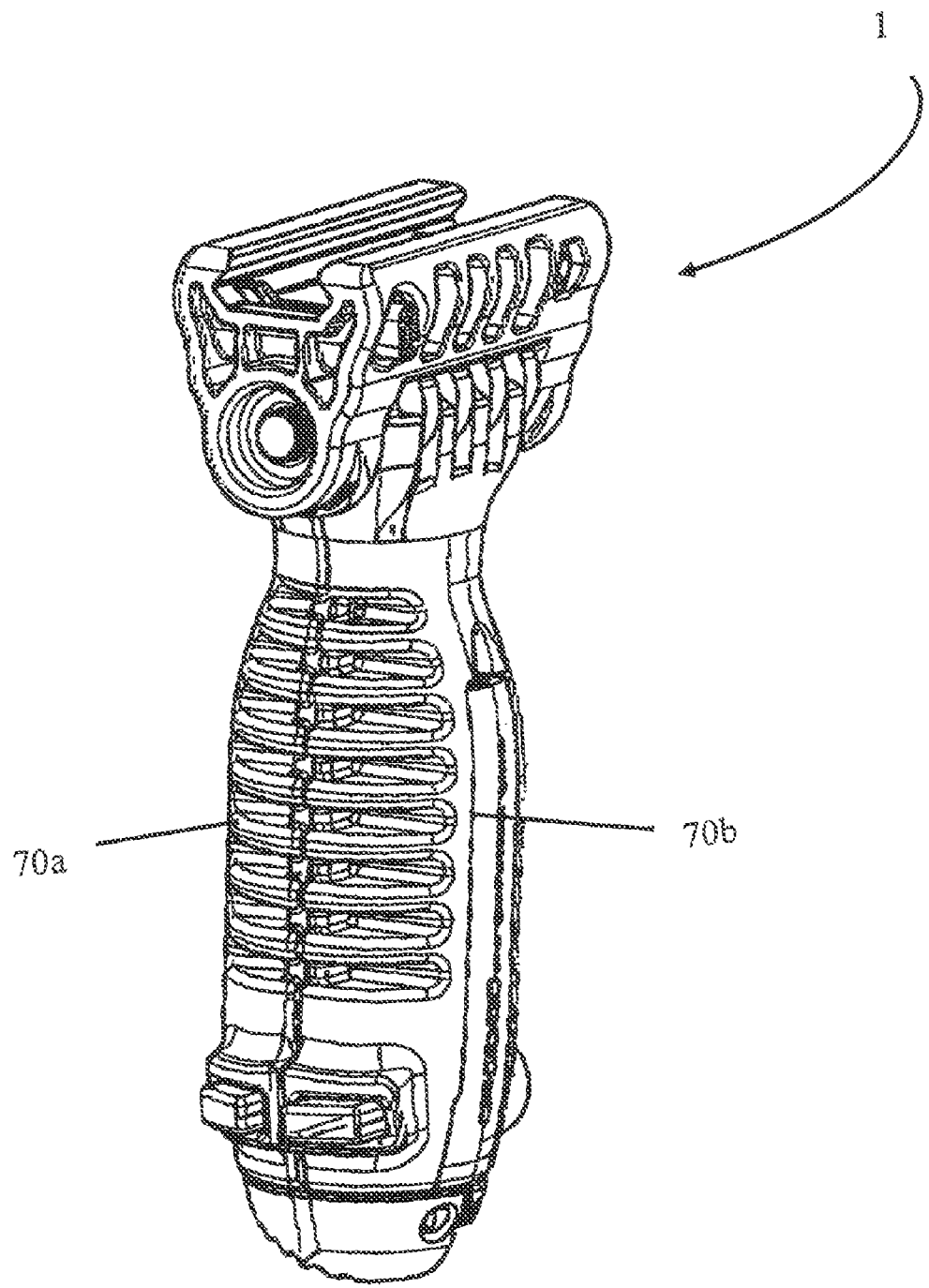
FIG. 5 is a front perspective view of a grip constructed and operative in accordance with another embodiment of the present invention in a closed position.
Figure 6A:
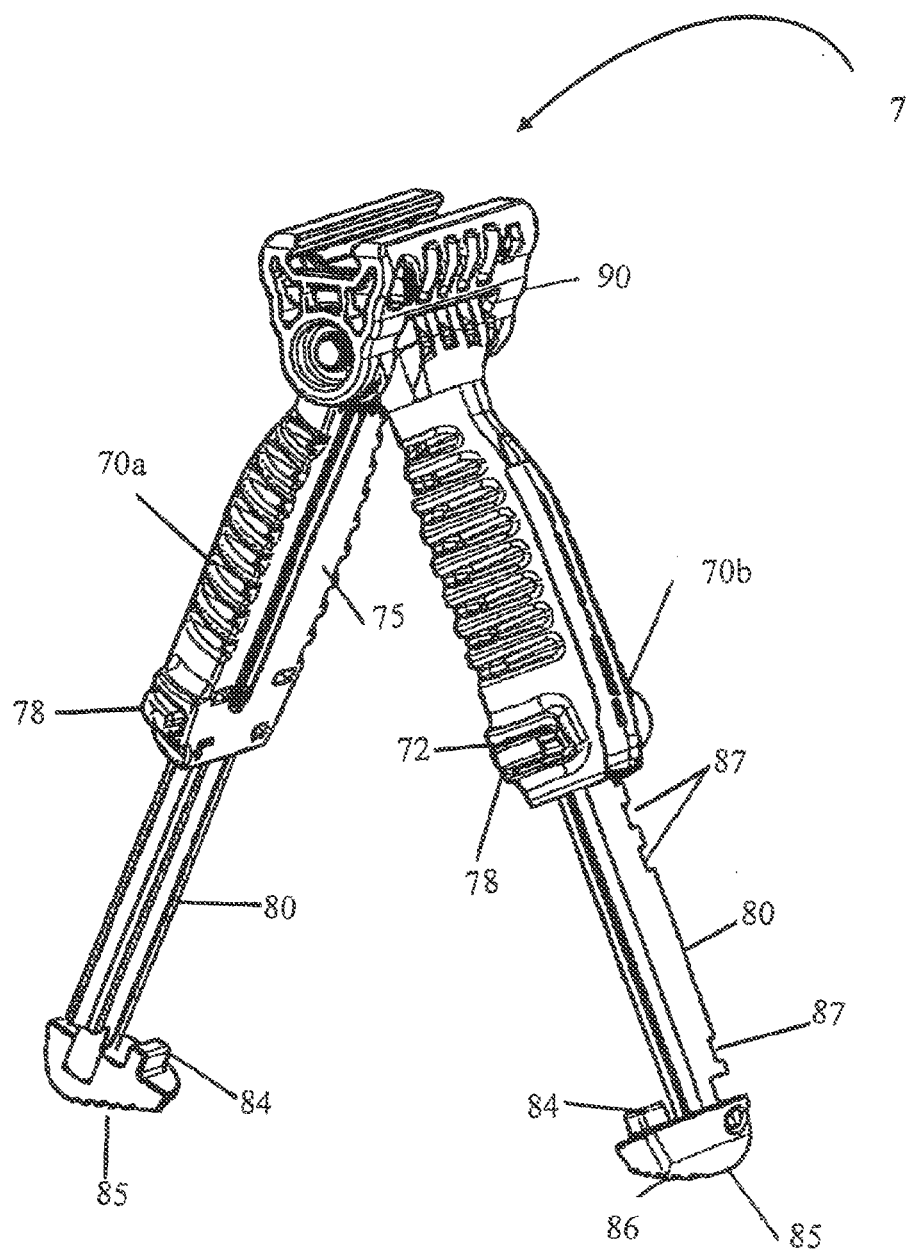
FIG. 6a is a perspective view of the grip of FIG. 5 in the deployed position.
Figure 6B:
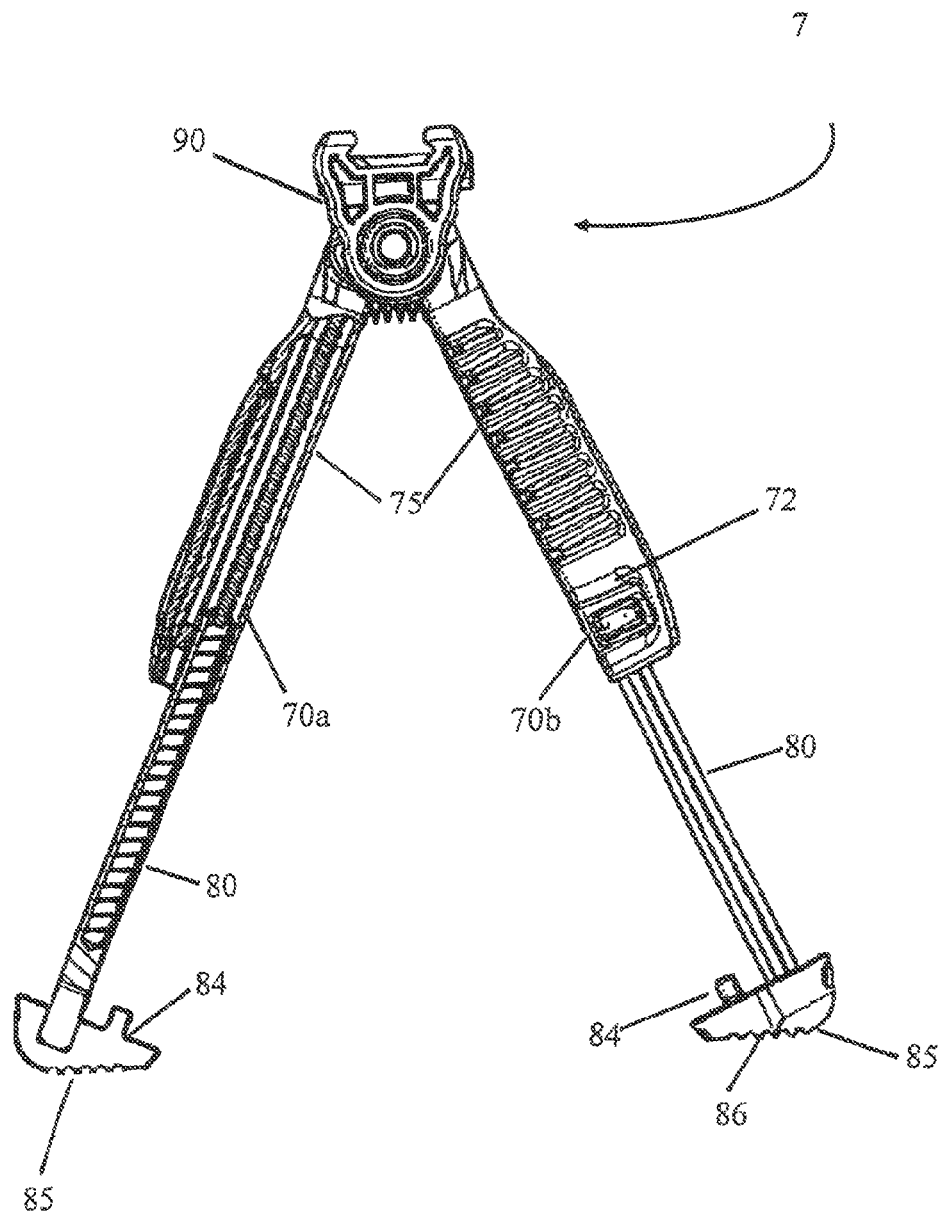
FIG. 6b is a partially cutaway front view of the grip of FIG. 6a in the deployed position.
Figure 6C:
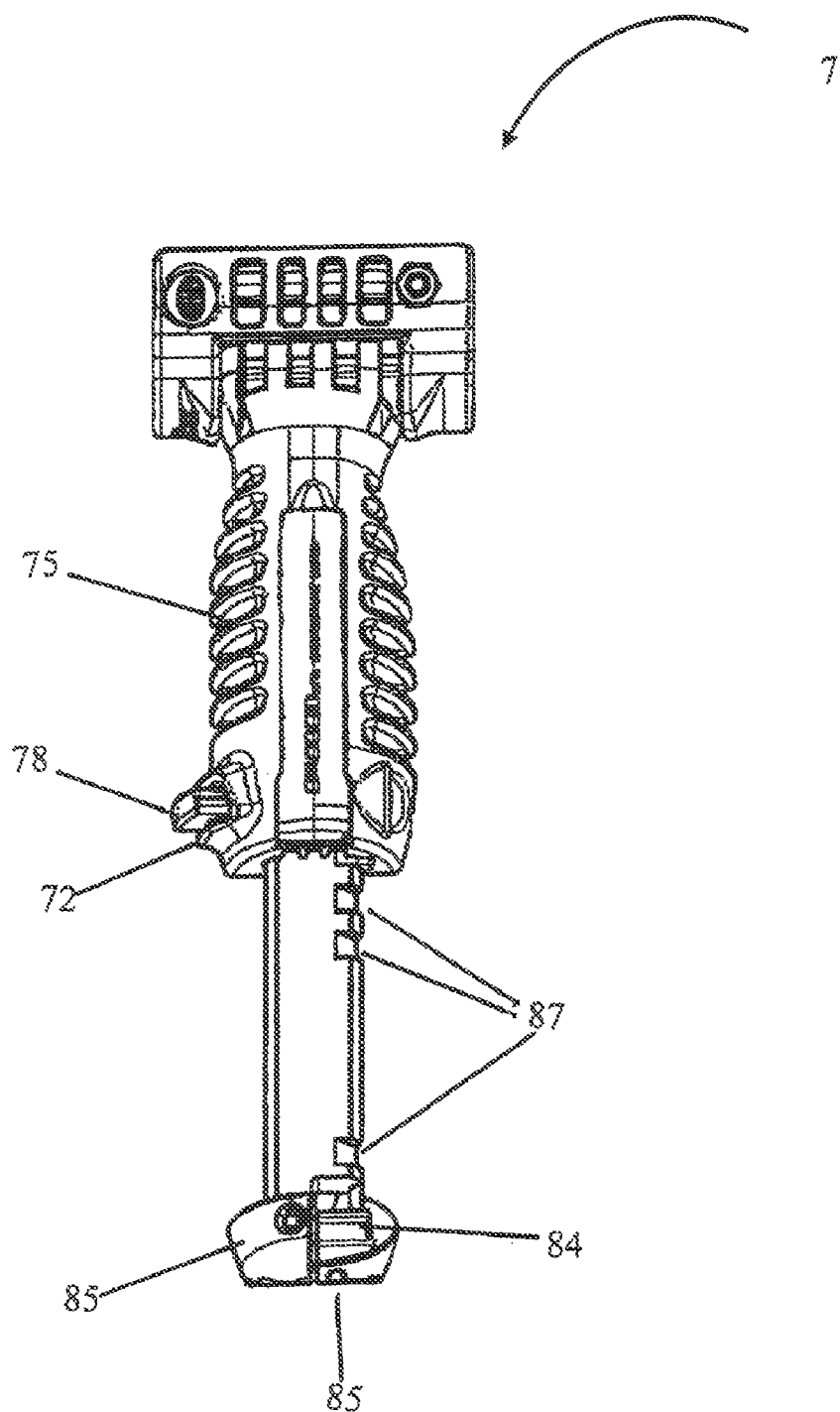
FIG. 6c is a side view of the grip of FIG. 6a with the unlocked telescoping legs together.

FIG. 4 is a side sectional view of the grip 1 and shows fastening hook 54 of monopod 10b engaged in opening 45 of monopod 10a. In this position, fastening hook 54 of foot 10a engages opening 45 of monopod 10b (not shown). It will be appreciated that fastening monopods 10a and 10b relative to each other may be accomplished in various other ways known in the art.

FIGS. 5 and 6a to 6c show a grip 7 according to another embodiment of the invention. Grip 7 is substantially similar to grip 1, and includes two monopods 70a and 70b, and a mounting assembly 90 for mounting the grip on the device. Each of monopods 70a and 70b includes a housing 75, having at least one telescoping leg 80. Each telescoping leg 80 includes a foot 85, with a fastening hook 84.

According to this embodiment, the bottom of each foot 85 is slanted and includes ridges 86 so as to enhance the frictional engagement with the surface on which the bipod is deployed and, thus, to increase the stability of monopods 70 on the ground when in the deployed position.

In addition, each telescoping leg 80 may be extended to the desired length and locked independently, thereby allowing the user to adjust the height and angle of the device on the bipod according to his preference and to stabilize the device on an uneven surface by extending one of legs 80 more than the other. A locking member may be provided to lock leg 80 relative to housing 75 at any desired length. According to the embodiment illustrated in FIGS. 6a-6c, adjusting the length of telescoping legs 80 is accomplished by engaging a stop member (not shown) inside one of a plurality of locking grooves 87 defined along the length of legs 80. The stop members may each be spring biased inside housing 75 and protrude outside the housings through apertures 72 to define push buttons 78. Each of buttons 78 is an independent button which can be pressed separately in order to adjust the leg of its associated leg, or together to release both legs substantially simultaneously.

The present invention can be modified to form a tripod, formed of three monopods, using three separate hinges around a ring instead of a single hinge 30 as described above, or to a grip formed of any desired number of monopods.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A grip comprising:
   at least two hinged monopods, each defining a housing and having an independent telescoping leg telescopingly mounted in one end of said housing, said monopods being arranged to pivot relative to one another from a fastened position to a deployed position, said monopods in the fastened position being joined and secured to one another to form a complete hand grip;
   said monopods defining toothed portions at another end of said housing arranged to interleave with one another when said monopods pivot relative to one another; and
   a mounting assembly for mounting the grip on a device, said mounting assembly including a hinge holding said toothed portions and forming a pivot axis therefor.

2. The grip of claim 1, wherein each said independent telescoping leg comprises:
   a spring biased leg telescopingly mounted in said housing.

3. The grip of claim 1, wherein said monopods further comprise locking means for locking said telescoping leg in or out of said housing.

4. The grip according to claim 3 wherein said locking means comprises:
   at least two locking grooves in said telescoping leg; and
   a spring biased locking member inside said housing selectably engageable in each of said grooves.

5. The grip of claim 1, wherein said monopods further comprise locking means for locking said telescoping leg at different lengths relative to said housing.

6. The grip of claim 1, wherein said monopods further comprise fastening means for locking said monopods relative to each other.

7. The grip according to claim 6, wherein said fastening means comprises a fastening hook on at least one of said telescoping legs engageable inside the housing of another said telescoping leg when said hand grip is formed.

8. The grip according to claim 1, wherein one side of each interleaved portion of each said monopod is arranged to engage said mounting assembly in said deployed position and a second side of each interleaved portion of each said monopod is arranged to engage said mounting assembly in said fastened position.

9. The grip according to claim 1, further comprising a fastening hook on at least one of said telescoping legs engageable inside a recess formed in another one of said telescoping legs to form said complete hand grip when said legs are fully inserted into said housings.

10. A method for forming a grip comprising:
    forming a mounting assembly including a hinge;
    forming at least two hinged monopods, each defining a housing and having an independent telescoping leg telescopingly mounted in one end of said housing, said monopods being arranged to pivot relative to one another from a fastened position to a deployed position, said monopods in the fastened position being joined and secured to one another forming a complete hand grip;
    defining toothed portions at another end of said housing arranged to interleave with one another when said monopods pivot relative to one another; and
    mounting said hinged monopods on said hinge in said mounting assembly, said hinge holding said toothed portions and forming a pivot axis therefore.

11. The method according to claim 10, further comprising providing release means on each of said monopods, for independently releasing said telescoping legs from said monopods.

12. The method according to claim 10, further comprising pivoting said monopods to said fastened position until one side of each interleaved portion of each said monopod engages said mounting assembly, and opening said monopods to said deployed position until a second side of each interleaved portion of each said monopod engages said mounting assembly.

13. The method according to claim 10, further comprising providing a fastening hook on at least one of said telescoping legs engageable inside a recess formed in another one of said telescoping legs, and forming said complete hand grip by fully inserting said legs into said housings.

* * * * *